Nov. 27, 1962

A. NIKKEL 3,065,802

AUTOMATIC BORDER BLOCKER

Filed Aug. 18, 1960

INVENTOR.

Albert Nikkel

BY

Victor J. Evans Co.

ATTORNEYS

Nov. 27, 1962  A. NIKKEL  3,065,802
AUTOMATIC BORDER BLOCKER
Filed Aug. 18, 1960  3 Sheets-Sheet 2

INVENTOR.
Albert Nikkel
BY
Victor J. Evans & Co.
ATTORNEYS

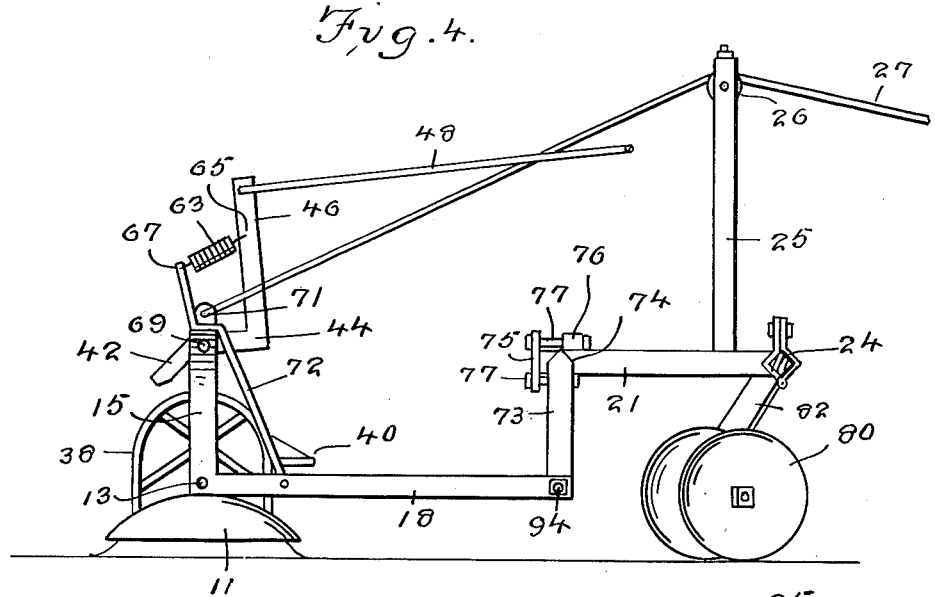
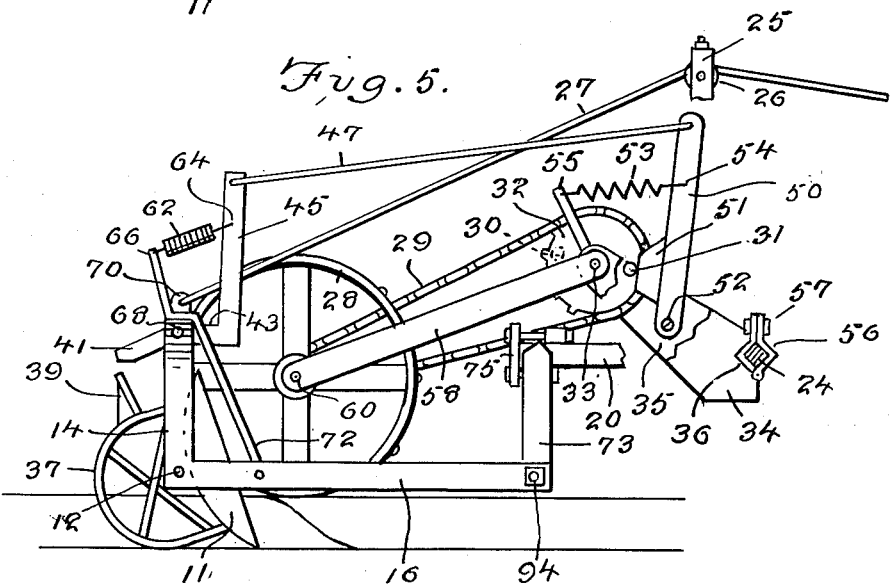

United States Patent Office

3,065,802
Patented Nov. 27, 1962

3,065,802
AUTOMATIC BORDER BLOCKER
Albert Nikkel, 184 Central Ave., Shafter, Calif.
Filed Aug. 18, 1960, Ser. No. 50,398
1 Claim. (Cl. 172—237)

This invention relates to agricultaure and particularly irrigating machines of the type used where it is desired to moisten soil before planting, commonly known as pre-irrigation; and, in particular, this invention includes an attachment for operating a furrow or ridge-making implement which scoops up the soil, opening a trench, and deposits the soil in a mound in the trench, forming a dam, and wherein the dams are formed at spaced intervals by a trip mechanism.

The purpose of this invention is to provide a relatively simple mechanism for forming dams in open trenches for preirrigating soil.

This invention is an improvement over the irrigation border dam-forming machine of my Patent No. 2,625,092, in that a single trip mechanism is provided between a pair of scoop elements and wherein the lift method is improved.

The object of this invention is, therefore, to provide an improved irrigation border dam-forming machine, wherein a single trip mechanism actuates a pair of forming elements.

Another object of the invention is to provide an improved lift method of irrigation border dam-forming machines, wherein the extended ends of the scoop elements are elevated, by a cable extended from a towing tractor over sheaves in a post, for transportation.

Another important object of the invention is to provide an improved border block or dam-forming machine in which the machine is designed to be attached to a conventional tractor.

Another important object of the invention is to provide the possibility of converting the automatic border blocker to a simple hand operated border blocker by removing the independently mounted automatic tripping mechanism.

A still further object of the invention is to provide an improved irrigation border dam-forming machine which is of a simple and economical construction.

With these and other objects and advantages in view, the invention embodies spaced parallel frames having scooping discs pivotally mounted in extended ends, a transversely disposed shaft having flat sides upon which the scoop carrying frames are mounted, a traction wheel rotatably mounted in the frame positioned between the scoop carrying frames, a trip mechanism mounted on the frame in which the traction wheel is rotatably mounted, and cables extended from the scoop carrying frames to sheaves of a post extended upwardly from the frame of the machine.

Other features and advantages of the invention will appear from the following description taken in connection with the drawings, wherein:

FIGURE 4 is a longitudinal section through the machine, taken on line 4—4 of FIGURE 1, showing one of the block or dam forming elements in the dam forming position.

FIGURE 5 is a side elevational view of the machine with the parts as shown in FIGURE 2, except that the trip mechanism is illustrated in the tripping position whereby a scoop actuated by the trip mechanism is released.

Figure 1:
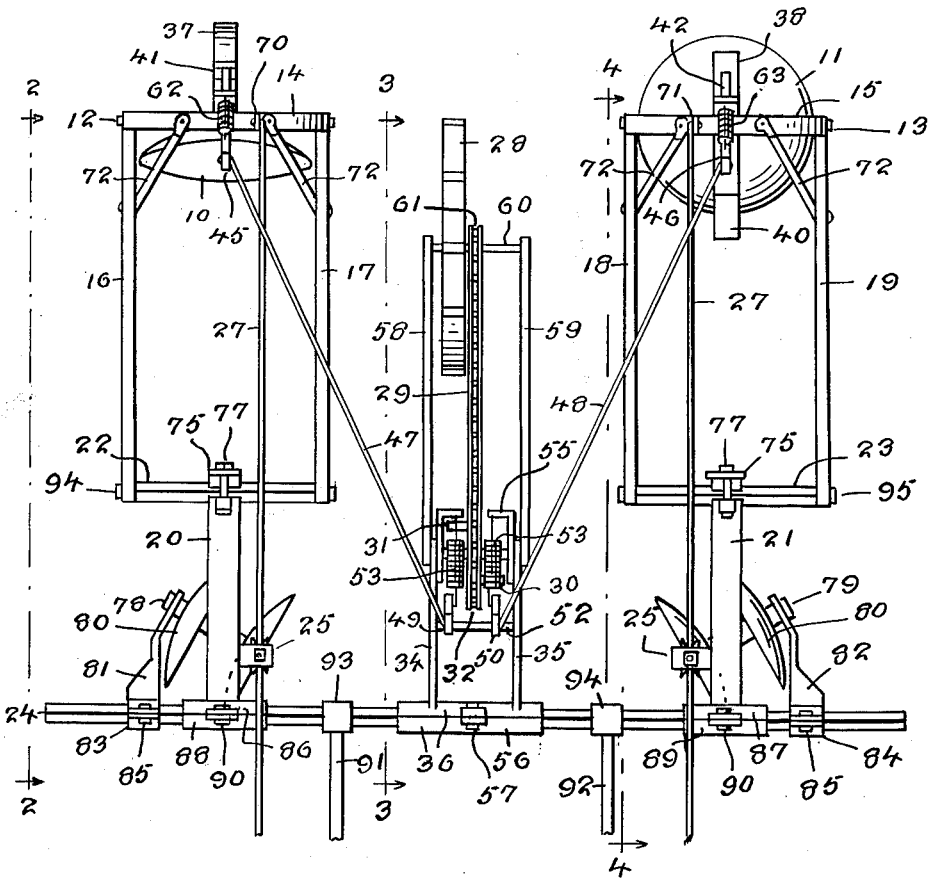
FIGURE 1 is a plan view of the improved border block machine, showing a single trip mechanism positioned between a pair of trench and dam forming elements.
Figure 6:
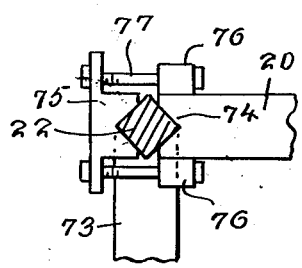
FIGURE 6 is a view, with the parts shown on an enlarged scale, showing the connection of the scoop-carrying bars to the horizontal portion of the frame of the machine.
Figure 7:
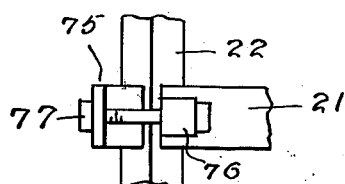
FIGURE 7 is a plan view of the connection illustrated in FIGURE 6.

Referring now to the drawing wherein like reference characters denote corresponding parts, the automatic border block machine of this invention includes discs 10 and 11, pivotally mounted by pins 12 and 13 in yokes 14 and 15, respectively, at the ends of the side bars 16 and 17 at the sides of the disc 10, and 18 and 19 at the sides of the disc 11, tongues 20 and 21, the trailing ends of which are connected by square shafts 22 and 23 to forward ends of the side bars, and the leading ends of which are connected to a transversely disposed square shaft 24, posts 25 having sheaves 26 in the upper ends over which cables 27 extend; and a traction wheel 28 operatively connected by a chain 29 to a trip mechanism, including pins 30 and 31 extended from sides of a sprocket 32 which is rotatably mounted by pins 33 in arms 34 and 35 extended from a hub 36 on the transverse shaft 24.

The discs 10 and 11, which are arcuate in cross section, providing scoops, are provided with reinforcing frames 37 and 38, from which arms 39 and 40 extend, and the arms are positioned to engage the ends of stops 41 and 42, respectively, extended from legs 43 and 44 of L-shaped levers 45 and 46, which are connected by rods 47 and 48 to levers 49 and 50 on which cams 51, that are positioned to be engaged by the pins 31 and 30, are mounted. The levers 49 and 50 are pivotally mounted by a bolt 52 that is mounted in the arms 34 and 35 which extend from the hub 36 of the shaft 24. The levers 49 and 50 are urged rearwardly by springs 53, one of the ends of which are connected in openings 54 of the levers and the opposite ends of which are connected to fingers 55 extended from the arms 34 and 35. The arms 34 and 35 are secured on the hub 36, such as by welding, and the hub is secured to the shaft 24 by a clamp section 56 that is held by a bolt 57.

The traction wheel 28 is mounted in extended ends of bars 58 and 59, by a shaft 60, and the shaft 60 is also provided with a sprocket 61 that is aligned with the sprocket 32 on the shaft 33.

Upon rotation of the wheel 28, the sprocket 32 is rotated by the chain 29, and upon engagement of the pins 30 and 31 with one of the cams 51, the levers 49 and 50 are urged forwardly, whereby the rods 47 draw the members 45 forwardly, elevating the stops 41 and 42 and thereby releasing the arms 39 and 40. The members 45 and 46 are urged rearwardly by springs 62 and 63, forward ends of which are secured in openings 64 and 65 of the members 45 and 46 and the opposite ends of which are secured to upper ends of bars 66 and 67. The members 45 and 46 are pivotally-mounted by pins 68 and 69 in the upper ends of the yokes 14 and 15, and the upper ends of the yokes are also provided with eyes 70 and 71 to which the cables 27, which are trained over the sheaves 26 in the posts 25, are connected.

The yokes 14 and 15 are supported in upright positions by diagonal braces 72, and the shafts 22 and 23 to which forward ends of the side bars 15, 17, 18 and 19 are connected, are suspended from the shafts 22 and 23 by arms 73.

The shafts 22 and 23 are secured in V-shaped notches 74 in the tongues 20 and 21 by plates 75 that are secured to ears 76 on the tongues by bolts 77.

The posts 25 are mounted on the sides of the tongues 20 and 21, and the diagonally positioned shafts 78 and 79, upon which discs 80 are positioned, are mounted with inner ends thereof rotatably mounted in lower ends of the posts and outer ends rotatably mounted in brackets 81 and 82 carried by the shaft 24. The brackets 81 and 82 are secured to the shaft 24 by clamps 83 and 84 in which bolts 85 are positioned. The tongues 20 and 21 extend from hubs 86 and 87 and the hubs are clamped on the shaft by caps 88 and 89 in which bolts 90 are positioned.

The transversely disposed shaft 24 is connected to lift arms of a tractor by bars 91 and 92 which extend from hubs 93 and 94 on the shaft, as shown in FIGURE 1.

With the attachment drawn forwardly by a tractor, or the like, the traction wheel 28 rotates the sprocket 32 through the chain 29, whereby the pins 30 and 31 engage the cams 51, drawing the members 45 or 46 forwardly and elevating one of the stops 41 and 42, whereby the corresponding arm 39 or 40 is released. Upon release of the arms, a scoop or disc from which the arm extends is released, whereby the disc rotates from the position shown in FIGURE 2 to that shown in FIGURE 4, in which movement the disc packs the soil, such as the soil 93 forming a mound or dam.

The pins 30 and 31 are set, whereby the disc 11 is held in an upright or operative position while the disc 10 is released, and by this means the trenches and dams are alternately positioned.

The forward end of the cable 27 is anchored to a stationary point on a towing tractor, and when the square tool bar 24 is raised by a hydraulic or mechanical lift the cable is pulled tight or so that it is in tension and the blocker frames are elevated above the ground. This provides clearance for transportation and turning at the ends of the fields. The cable 27 remains slack while operating thereby obtaining flotation of the blocker frames while the machine is operating in the field.

The transforming discs are actuated to form blocks or dams by an independent trip mechanism positioned in the center of the machine and designed to operate the discs in the two side frames.

Figure 2:
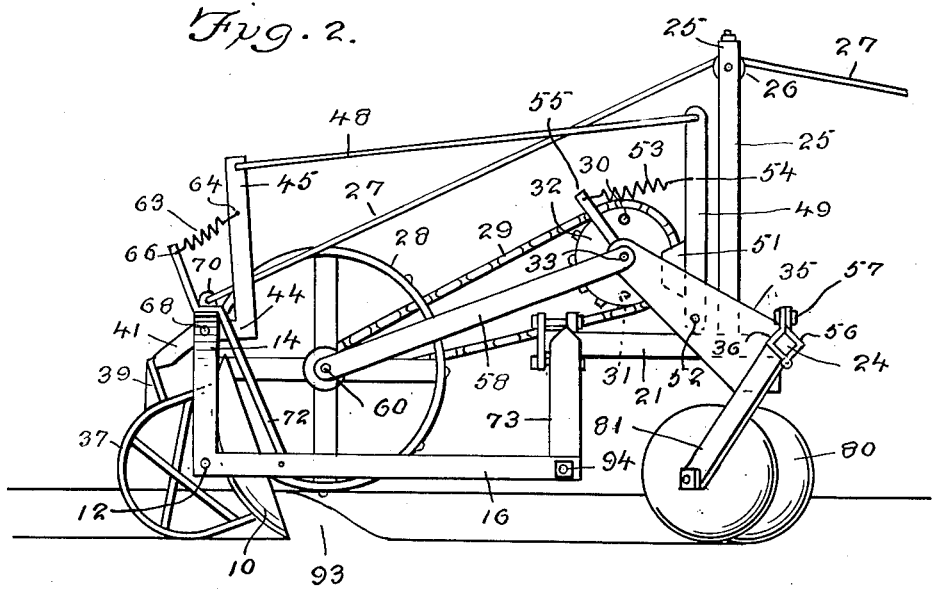
FIGURE 2 is a side elevational view of the machine taken on line 2—2 of FIGURE 1, showing one of the trench forming scoops in an operative or trench forming position.
Figure 3:
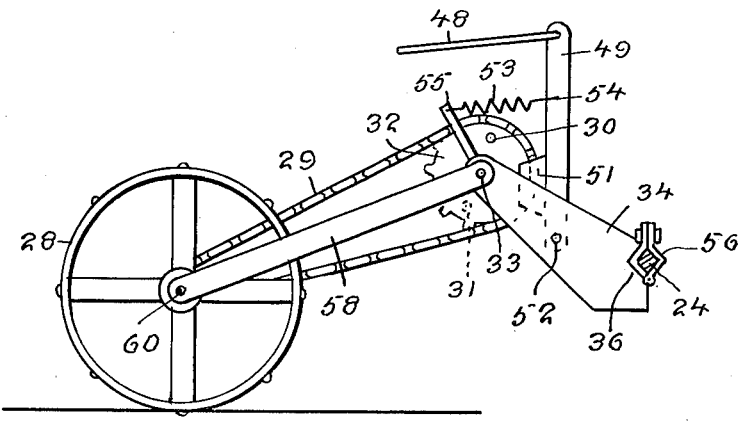
FIGURE 3 is a longitudinal section through the intermediate part of the machine, taken on line 3—3 of FIGURE 1, illustrating the trip mechanism, and with other parts omitted.

The trip mechanism includes side bars 58 and 59 with a ground engaging or traction wheel 28 rotatably mounted by a shaft 60 in the extended ends of the side bars and with a chain trained over sprockets actuated by the traction wheel and operating cam engaging pins extended from the sides of a sprocket over which the chain is trained. The cams engaged by the pins of the sprocket may be used for tripping the dam forming discs of this attachment and it is also understood that the cams or other similar elements may be used on corn planters or other agricultural implements, or on other machines for other purposes. The traction wheel may also actuate cams or other elements by means of other connecting elements and the arrangement of the parts may be redesigned to compensate for machines of different types. The wheel 28 runs on the ground and turns the sprocket 32, and the sprocket 32 has two pins 30 and 31 which trip the levers 49 and 50. The levers 49 and 50 have rods 47 and 48 that operate the levers 45 and 46 to release the discs 10 and 11. As the machine moves forward the disc 10, as shown in FIGURE 2, engages the ground and turns to the position shown in FIGURE 4. As the machine moves, the dirt or mound will contact the back of the disc and the ground will be engaged and there will be rolling movement at the points 39 or 40 and then rolling action takes place on the elements 37 or 38. When the members 39 or 40 engages the levers 49 and 50, the device will stop at the starting position of FIGURE 2.

It will be understood that modifications, within the scope of the appended claim, may be made in the design and arrangement of the parts without departing from the spirit of the invention.

What is claimed is:

In an automatic irrigation border blocker, the combination which comprises laterally spaced longitudinally disposed frames having forward ends and rearward ends, a shaft positioned transversely with respect to said frames and spaced from the forward ends thereof, a tongue connecting the forward end of each frame to said shaft, a disc disposed within each frame adjacent to the rearward end of said frame and connected to said frame for pivotal movement from an upright forwardly facing position to a horizontal position facing downwardly, inner engaging cooperating latch elements operatively connected to each of said discs and to the adjacent frame for releasably holding said discs in the upright position, and a trip mechanism disposed between said frames and carried by said shaft, said mechanism including a ground engaging wheel, a rotatable sprocket drivably connected to said wheel, at least one pin projecting from each side of said sprocket, a first cam drivably connected to one of said latch elements, and a second cam drivably connected to the other of said latch elements, each of said cams being disposed in the path of movement of the adjacent pin and operable to shift said latch element to release position responsive to rotation of said sprocket and engagement with said adjacent pin.

References Cited in the file of this patent

UNITED STATES PATENTS

| | | |
|---|---|---|
| 142,187 | Ansley et al. | Aug. 26, 1873 |
| 161,873 | Eckman | Apr. 13, 1875 |
| 582,210 | LaRue | May 11, 1897 |
| 1,507,218 | Trapnell | Sept. 2, 1924 |
| 2,086,350 | Brown | July 6, 1937 |
| 2,494,820 | Lion | Jan. 17, 1950 |
| 2,625,092 | Nikkel | Jan. 13, 1953 |
| 2,767,633 | Franz | Oct. 23, 1956 |

FOREIGN PATENTS

| | | |
|---|---|---|
| 812,739 | Germany | Sept. 3, 1951 |